United States Patent [19]
Smalley

[11] 3,904,226
[45] Sept. 9, 1975

[54] HITCH

[76] Inventor: Carl J. Smalley, Rt. 2, Berne, Ind. 46711

[22] Filed: Sept. 4, 1973

[21] Appl. No.: 394,304

[52] U.S. Cl. ............................................. 280/486
[51] Int. Cl.² ............................................ B60D 1/00
[58] Field of Search ............... 280/485, 486, 487; 267/138, 141, 71, 72; 114/235 R, 235 A

[56] References Cited
UNITED STATES PATENTS

| 2,189,170 | 2/1940 | Gaussoin | 280/487 X |
| 3,000,652 | 9/1961 | Hawkins | 280/485 X |
| 3,667,418 | 6/1972 | Janssen | 280/486 X |

FOREIGN PATENTS OR APPLICATIONS

| 512,227 | 1/1955 | Italy | 280/487 |

Primary Examiner—Leo Friaglia
Assistant Examiner—R. Schrecengost

[57] ABSTRACT

There is disclosed a hitch construction for use in towing vehicles, said construction having means for mounting the hitch on a towing vehicle and providing a connection for engagement with the tongue or similar part of the vehicle to be towed, the hitch embodying shock absorbing construction operable to reduce the forces on both the towed and towing vehicles which are not only uncomfortable but may be damaging to such vehicles, including cushion means in the form of compressible bushings located in a housing, which provides for deflection of the bushing within predetermined limits to a point where no further deflection is permitted and starting and stopping forces are dissipated.

1 Claim, 5 Drawing Figures

PATENTED SEP 9 1975  3,904,226

3,904,226

HITCH

OBJECTS OF THE INVENTION

It is a principal object of this invention to provide a hitch which may be termed a drawbar hitch, which finds its primary application in connection with farm or like vehicles where heavy trailers or similar vehicles are to be towed by a tractor or truck, and it is desired to reduce or in fact eliminate the usual damaging effects of such towing caused by sudden starting and stopping action during use.

It is a further object of this invention to provide a hitch of the class described in which a simple arrangement is involved which enables not only adjustment of the amount of shock forces transmitted, but eliminates vibratory action which might result from use of springs or similar devices, the damping effect of the construction being responsible for smooth starting and stopping.

Another object of the invention is to provide in a hitch of the class described, construction which incorporates therein polyurethane bushings to absorb the shock and to limit the extent of movement of the respective parts so that there is no pendulum action and yet the hitch may be used in not only highway conditions but also under farm and other conditions which do not require the speed or massive parts which are sometimes required for various conditions of vehicle operation and class of vehicle as well.

A still further object of the invention is to provide a hitch of simple construction which may be used not only for those purposes hereinbefore described, but likewise for towing various kinds of vehicles of both heavy and light construction with provisions for adjustment where desired to effect the damping action and yet provide for resiliency and cushioning between the respective vehicles.

Other and further objects of the invention will be understood from a specification appended hereto, and disclosed in the drawing, wherein.

DESCRIPTION OF THE INVENTION

Figure 1:
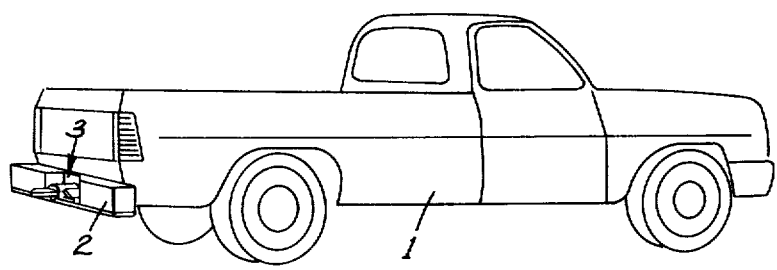
FIG. 1 is a perspective view to illustrate the environment and disclose the hitch in a location where its usefulness is apparent.

Referring now to FIG. 1, the same discloses a vehicle of the pick-up truck class, generally denoted 1, having the common form of box bumper 2 at the rear thereof with the hitch which is the subject of this invention generally indicated at 3.

Figure 2:
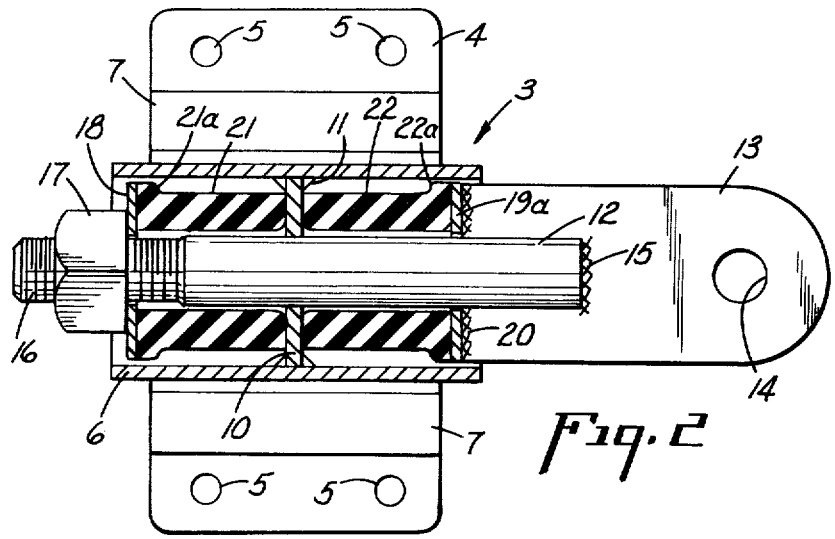
FIG. 2 is a horizontal sectional view to show the construction of the hitch and its cushioning arrangement.

Refering now to FIG. 2, the hitch 3 hereof is shown as comprising a generally rectangular base or mounting member denoted 4, having suitable mounting holes such as 5 therein to enable the bolting of the unit as a whole to the bumper such as 2 and indicated in FIG. 1.

Figures 3, 4:
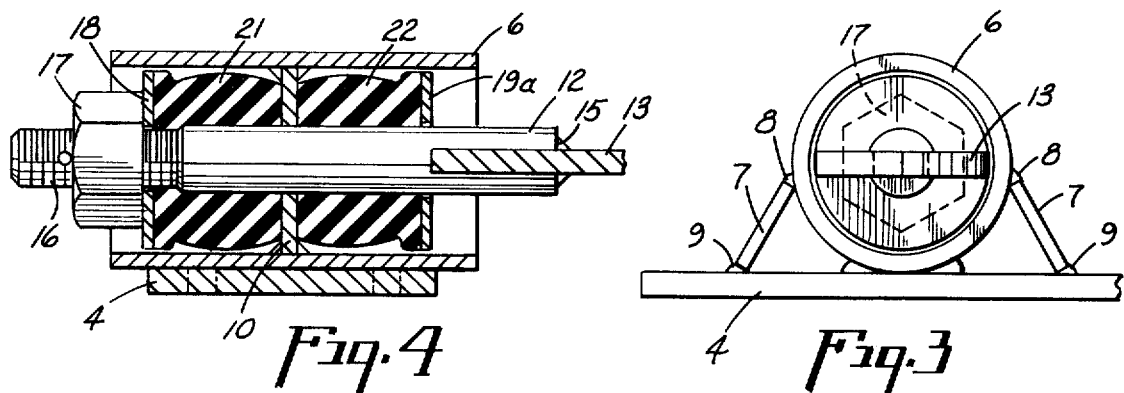
FIG. 3 is a view taken from the right-hand end of FIG. 2.
FIG. 4 is a vertical sectional view to illustrate the respective parts in one of the adjusted positions for use.

As suggested in FIG. 3, the base 4 is provided with a tubular housing 6 which is suitably positioned on the base by welding the leg members 7 thereto, one at each side at the points suggested at 8 at the upper ends and 9 at the lower end edges thereof.

It will be understood that the tubular housing 6 is firmly positioned on the base 4, and further is provided intermediate its ends and extending transversely thereacross with a load transfer element 10 which is of washer-like construction, suitably fastened as by welding at 11 around its periphery to the interior of the housing 6.

Extending through the load transfer element 10, is an adjusting part 12 being a rod-like member, suitably fastened at one end to a connector 13, which connector 13 is an elongated flat member having a suitable opening 14 in its outer extremity by which the same may be connected to the tongue or similar part of the vehicle to be towed, this connector 13 being fastened to the adjusting part 12 by welding as suggested at 15.

The other end of the adjusting part 12 is provided with suitable threads 16 upon which a nut 17 is supported and adapted to be manipulated in accordance with the subsequently described arrangement.

Suitable restricting means 18 and 19a in the form of washer-like parts similar to the load transfer element 10 are provided, the part 19a being fastened to the connector 13 by welding as at 20, and the restricting means 18 being free to be moved in accordance with the action of the nut 17 on the threads 16 of the adjusting part 12.

In order to provide for cushioning and adjustment of load transfer, a pair of bushings denoted 21 and 22 are availed of, these being formed of polyurethane such as that denoted neothane by Goodyear Tire and Rubber Company, and preferably of approximately 90 durometer for purposes which will be understood as this description proceeds.

It is noted that the bushings 21 and 22 are substantially identical but arranged in somewhat complementary manner, being equipped in each case with a shoulder 21a and 22a respectively, the balance of the bushing in each case being substantially uniform in wall thickness and cylindrical as readily understood from the disclosure.

As disclosed in FIG. 2, the bushings are not under compression, but the adjustment is made so as to merely position them in complete contact with the restricting means 18 and 19a and the load transfer element 10.

However, in order to best use the characteristics of this bushing, and in this instance of the pair of bushings, the same may be placed under compression, to assume the general attitude indicated in FIG. 4, wherein the central portions thereof are slightly bulged so to speak, and the restricting means 18 and 19a drawn toward the load transfer element 10.

It will be apparent that this is effected by manipulation of the nut 17 and substantial compression is effected thereby and may be adjusted in accordance with the amount of load being handled by the hitch.

In fact, the bushing is designed to be deflected in each case one-quarter inch for each one, making a total deflection of ½ inch for example, which would provide a spring rate of approximately 11,600 lbs./inch.

Figure 5:
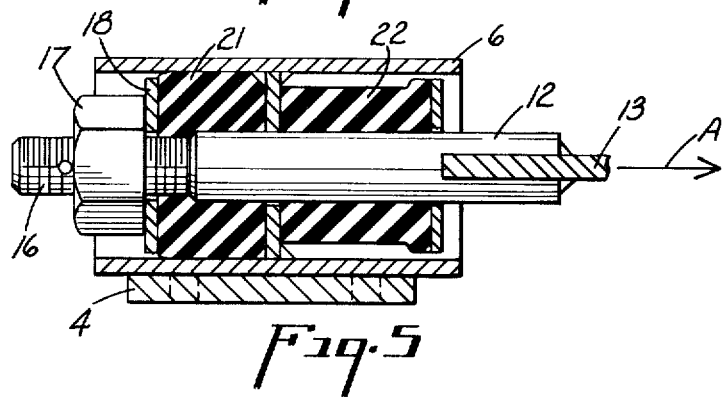
FIG. 5 is a view, similar to FIG. 4, showing the respective parts with the application of pulling force exerted in the direction of the arrow.

This would provide that a drawbar pull of 1,000 lbs. would deflect the assembly as suggested possibly in FIG. 5 upon the pull being directed toward the direction of the arrow A in that view, resulting in a pull deflection of 0.086 inches.

It will be understood that when this deflection reaches this point, the bushing has substantially filled and is in a complete engagement with the interior of the tubular housing 6, that is the bushing 21 is in this condition, and the bushing 22 is in what may be termed a completely relaxed condition for all intents and purposes.

This condition would obtain for example during the initial start-up of the vehicle which is effecting the pulling and a reverse movement of the connector would be effected so that the bushing 22 would be in the condition of the bushing 21 during stopping action directed to the towed vehicle.

One of the primary reasons for using the polyurethane bushings herein described is the many good characteristics which they have and these being very good aging qualities and abrasion resistance, the dampening characteristics being better than average.

Other aspects of favorable selection of this material, are the good resistance to oil deterioration and relatively low compression set.

From the foregoing, it will be understood that by varying the respective dimensions, but maintaining the general construction of the parts, hitches for various size pulling operations may be provided, the one generally contemplated hereby being that of arm or similar use as well as highway operation to reduce damaging action on both the towing and towed vehicles.

I claim:

1. In hitch construction in combination, a mounting member, a tubular housing connected thereto, connecting instrumentalities within said housing, said instrumentalities including a connector extending out of the housing, a connecting part fastened to the connector, a load transfer element fixed to the housing, said part extending through said element, restraining means carried by the instrumentalities and shock absorbing means intermediate the restraining means and the transfer element whereby a load tending to move the connector in and out of the housing will be cushioned in movement in both directions and comprises elastomeric compressible bushings mounted on the connecting part at opposite sides of the load transfer element and between the restraining means and contained entirely within the housing, the cross-sectional area of the housing being greater than that of the bushings, the connecting part includes a nut disposed at least partially outside said housing and positioned to adjust the compression including prestressing of the bushings whereby to vary the deflection directed to the connector, the total deflection being limited by the diameter and length of the housing within which the bushings are confined, which is proportioned to limit the diameter and length to which the bushings may be deflected.

* * * * *